Patented May 19, 1931

1,805,775

UNITED STATES PATENT OFFICE

FRANK E. LICHTENTHAELER, OF NEWTON HIGHLANDS, MASSACHUSETTS

METHOD OF MAKING ESTERS OF THE FATTY ACIDS

No Drawing.  Application filed January 21, 1926.  Serial No. 82,854.

The present invention relates to an improved method of making esters of the fatty acids.

Esters such as methyl acetate and ethyl acetate are produced commercially by well-known methods usually employing in the reaction the salt of the fatty acid or the concentrated acid itself and the required alcohol in the presence of a so-called dehydrating agent such as sulphuric acid, which, in fact, is a catalyst. Thus

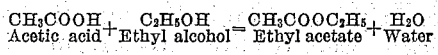
$$CH_3COOH + C_2H_5OH = CH_3COOC_2H_5 + H_2O$$
Acetic acid + Ethyl alcohol = Ethyl acetate + Water This reaction being reversible, reaches an equilibrium before completion, and it is usual, therefore, to remove the ester by distillation about as fast as it is formed, in which case the interaction of the acid and alcohol approximates completion.

As the process of esterification proceeds, the increase in the amount of water present slows up the reaction except in the presence of an excess of alcohol which was either originally present or added during the operation. One object of the invention is to produce a method of making esters requiring a less amount of alcohol. Another object is to produce a method for this purpose, adapted for use with dilute acids. The invention consists in the method hereinafter described and particularly defined in the claims.

A specific method will first be described. 100 grams of dilute acetic acid, say 10.6% acetic by titration, is mixed with 18 grams of ethyl alcohol (95% by volume) and 10 grams of sulphuric acid (50° Baumé). To this mixture is then added 135 grams of anhydrous ammonium alum. During the addition of the alum, and thereafter during the working of the method, the mixture is stirred, the temperature being maintained either by heating or cooling, as may be required, to maintain a favorable temperature safely below the decomposition point of hydrated ammonium alum, that is to say, below 94° C. The rate of the reaction is faster with higher temperatures, and consequently it is desirable to conduct this reaction at a temperature as high as may safely be done without danger of passing the critical point of 94° C. At the beginning of the stirring operation the anhydrous ammonium alum begins to take up the water present in the solution, and thus the percentage of alcohol in the fluid mixture rises, and conditions favorable for esterification occur. The reaction begins as soon as the percentage of water in the liquid falls sufficiently to produce the desired percentage of alcohol. The sulphuric acid acts as the catalyst and initiates and sustains the formation of the ester. The anhydrous alum by fixation of the water, that is, by taking up the water and its transformation into a hydrated ammonium alum, causes the reaction to take place at maximum concentration of the reacting materials. This is the most favorable condition. As the esterification continues, the anhydrous ammonium alum present takes up and fixates the water produced during the process of esterification, and the reaction as the stirring continues, continues to completion. When the reaction is completed there is present hydrated ammonium alum and ethyl acetate, the former in solid and the latter in liquid form. The continuous stirring prevents the crystals of hydrated ammonium alum from forming a solid mass. They are in a condition of loose, apparently dry crystals, and the mass gives a strong odor of ethyl acetate.

The mass of crystals is now treated to remove the ester by heating it slowly and gradually under sufficient vacuum to cause the easy removal of the ester normally boiling at 77° C. In order to remove all of the ester the process may be carried on to a point beyond that at which pure ester alone is distilled off and some acetic acid and water will be carried over with it. This will be removed by subsequent operations.

It is preferred to remove the esters in a vacuum because of the lesser degree of heat required, but the invention contemplates the removal of the esters at atmospheric pressures. Any excess of alcohol present in the mass of crystals will be distilled off in this process.

The hydrated ammonium alum may then be restored to its anhydrous condition by heating, when it is again available for use in fixation of the water present in the reaction.

The amount of alcohol used may vary considerably. That indicated in the specific instance above described is somewhat in excess of the amount required, but such excess is not injurious to the working of the method. In the present method of esterification of fatty acids an excess of alcohol is not required because the water is removed, it being the fact, it is understood, that the excess of alcohol necessary ordinarily for esterification is not required when the water is removed, as in this case.

It is to be noted that the esterification reaction of the present method proceeds to completeness by the removal of the water in the formation of the hydrated ammonium alum crystals.

While sulphuric acid has been referred to as a desirable ester-reaction catalyst, it is to be understood that other ester-reaction catalysts may be employed. Thus, sodium acid sulphate may be used as a catalyst, and, under ordinary conditions, is preferred because of its stability. It is further preferred because the catalyst remains with the hydrated ammonium alum crystals, while sulphuric acid would be somewhat decomposed in the removal of the ester, and subsequent heat treatment, whereas sodium acid sulphate would not so be decomposed.

Other suitable solid hydrate-forming salts, such as magnesium sulphate or potassium alum or the like, may be employed in place of ammonium alum.

The process is also available for use in the recovery of valuable products from pyroligneous liquor produced by wood distillation, that is to say, the methyl alcohol content of the liquor could be made to react with the acetic acid present to form methyl acetate, leaving an excess of acetic acid. The removal of the latter would require the addition of methyl or ethyl alcohol beyond that at present in the liquor to complete esterification of all the fatty acids present. The esters would then be removed, separated and refined by distillation for disposal as valuable esters or for subsequent saponification to regenerate the acids, acid salts and alcohols. Thus, a more or less direct removal of acetic acid from raw liquor would be possible, avoiding the present expensive and troublesome primary still and liming operations.

A process of esterification in dilute solutions has been proposed, in which case vinegar is the initial substance esterified in dilute solution by the use of an excess of alcohol and removing the ester. This, however, is open to the objection that the ester forms a constant boiling mixture with alcohol, and causes some of the latter to pass off with vaporized ester. This loss of alcohol must be made up by continuous addition in order that the exhaustion of the dilute acetic acid may continue. Again, the process involves an excess of alcohol in order to completely esterify the dilute acetic acid. Obviously, as the acid is gradually transformed, the solution becomes more and more dilute, and a greater and greater excess of alcohol is required. According to the present process, in contra-distinction therefrom, by the use of a hydrate fixation of the water the fatty acid and alcohol are permitted to react to completion, any excess of alcohol merely being required by reason of incomplete dehydration on the part of the hydrating salt. This is a matter entirely within the control of manipulation. Furthermore the present process does not require the use of large quantities of valuable alcohol which are merely locked up in the operation of the method, and require greater investment charges, both by reason of the use of a large quantity and by reason of the losses due to re-handling such volatile material. This present process, on the other hand, merely employs an inexpensive, non-volatile, hydrate-forming salt which may be used repeatedly without loss.

Having thus described the invention, what is claimed is:

1. The method of making esters of the fatty acids which consists in mixing together a dilute fatty acid, an alcohol, an ester-reaction catalyst and a quantity of hydrate forming salt sufficiently stable to withstand the esterification reaction temperature and non-reactive with any of the reagents of the process except with water and only to take up water of crystallization.

2. The method of making esters of fatty acids which consists in mixing together a dilute fatty acid, an alcohol, sodium acid sulphate and a quantity of hydrate-forming salt sufficiently stable to withstand the particular esterification reaction temperature and non-reactive with any of the reagents of the process except with water and only to take up water of crystallization.

3. The method of making esters of the fatty acids which consists in mixing together a dilute fatty acid, an alcohol, an ester-reaction catalyst, and a quantity of anhydrous ammonium alum.

4. The method of making esters of the fatty acids which consists in mixing together a dilute fatty acid, an alcohol, sodium-acid-sulphate, and a quantity of anhydrous ammonium alum.

5. The method of making ethyl acetate which consists in mixing together dilute acetic acid, ethyl alcohol, sodium acid sulphate and anhydrous ammonium alum.

In testimony whereof I have signed my name to this specification.

FRANK E. LICHTENTHAELER.